April 29, 1952     H. A. SIMPSON     2,594,691
MANUFACTURE OF SLIDE FASTENERS
Filed July 1, 1946     8 Sheets-Sheet 1
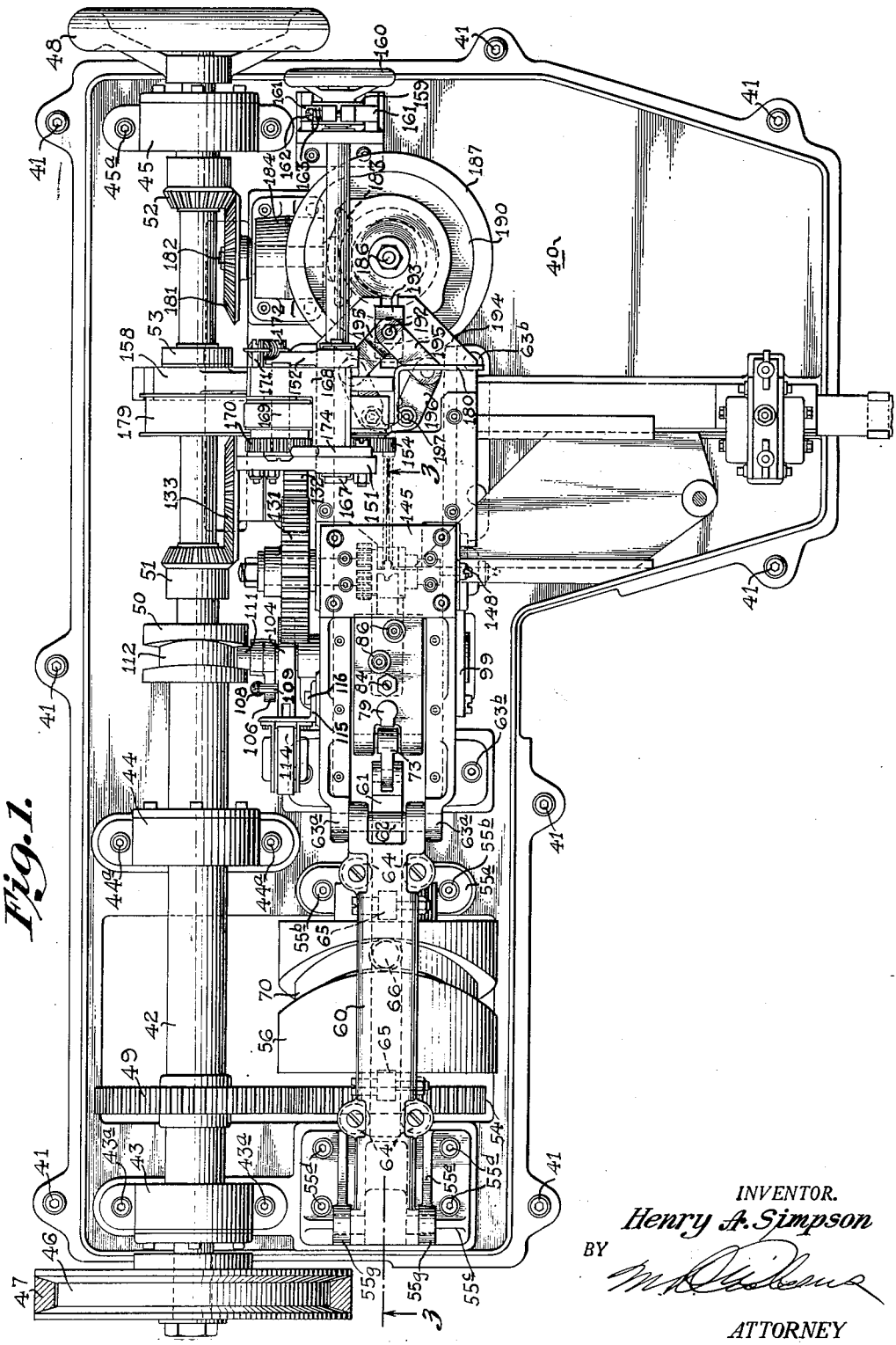
INVENTOR.
Henry A. Simpson
BY
ATTORNEY

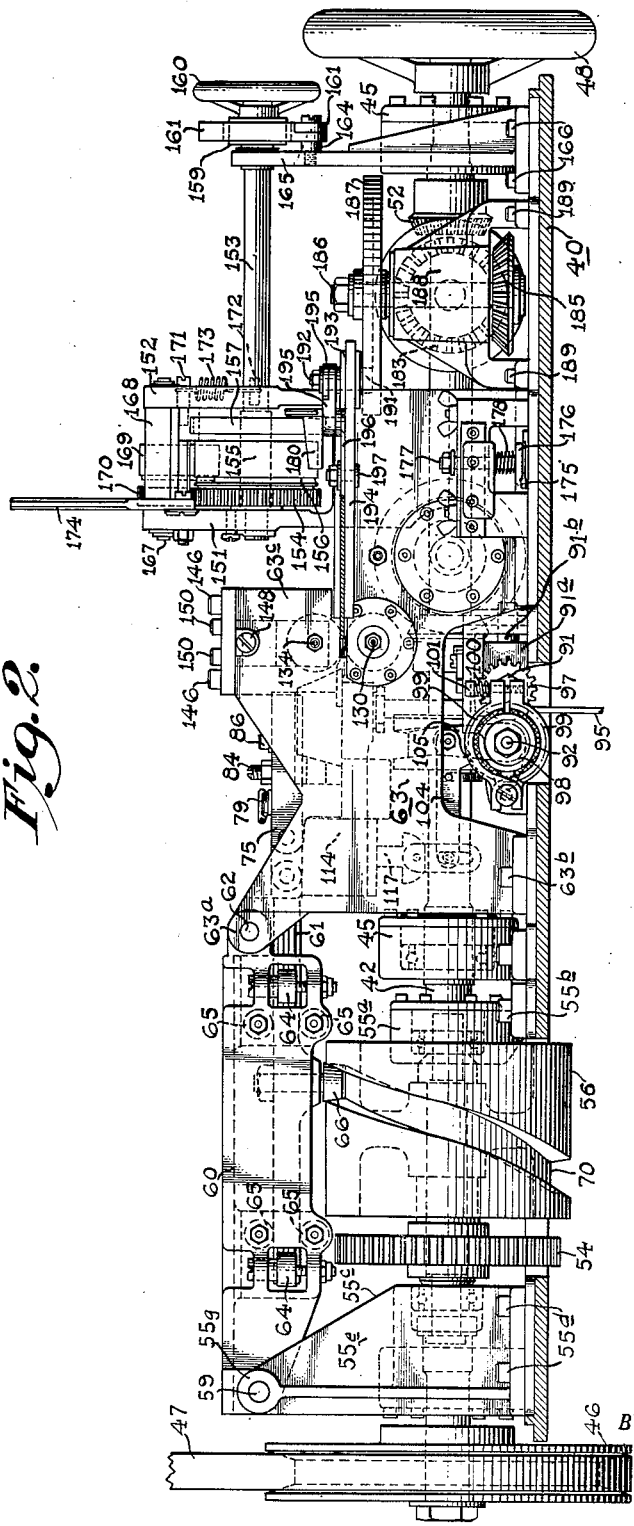

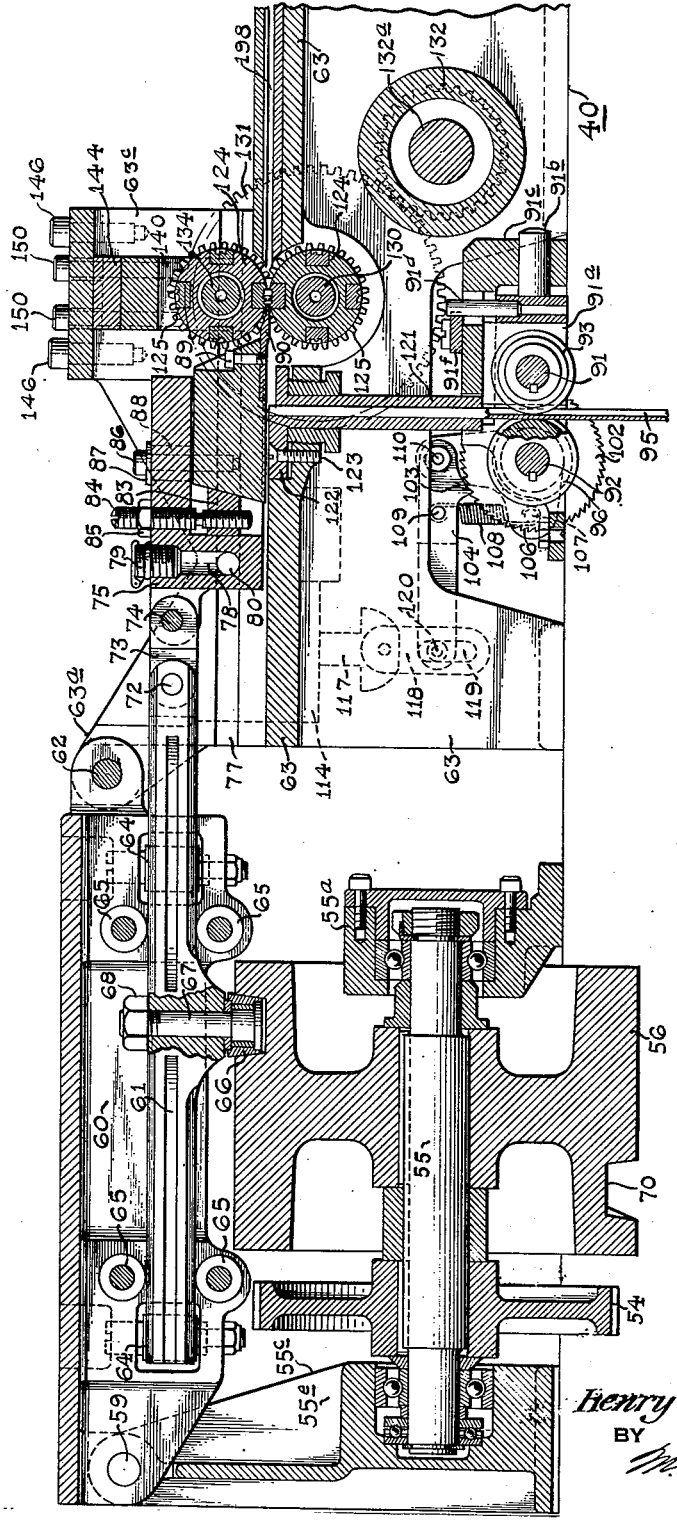

April 29, 1952     H. A. SIMPSON     2,594,691
MANUFACTURE OF SLIDE FASTENERS
Filed July 1, 1946     8 Sheets-Sheet 4
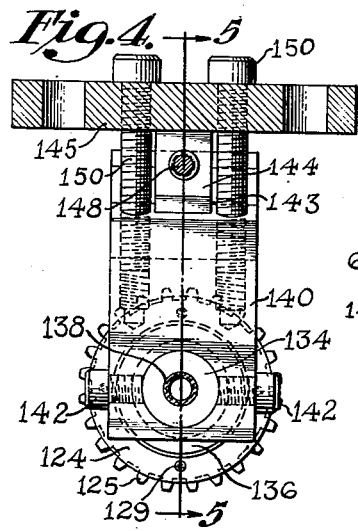
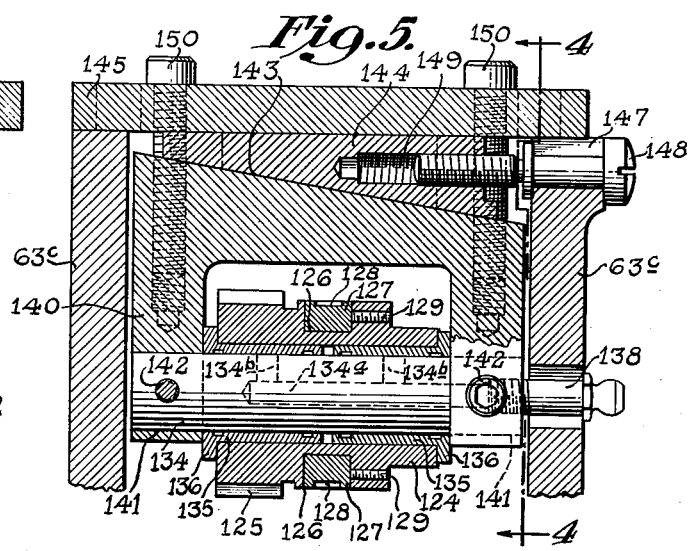
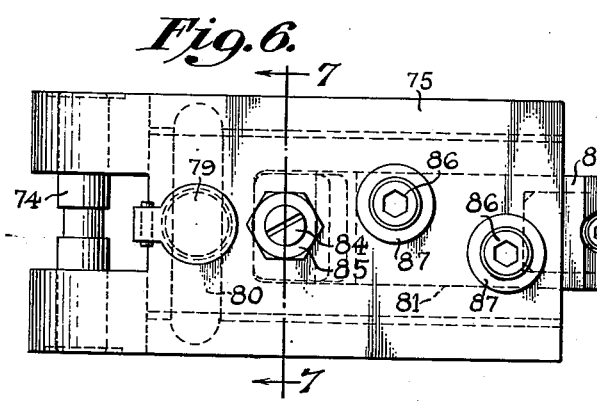
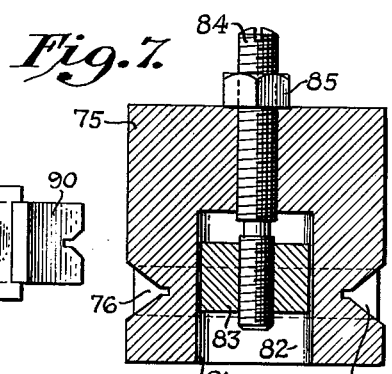
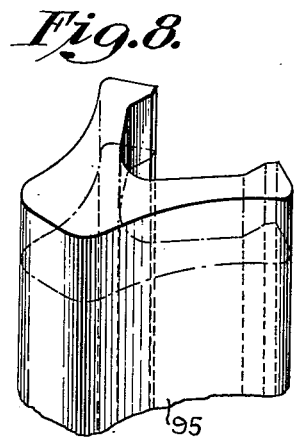
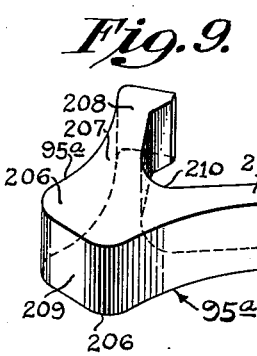
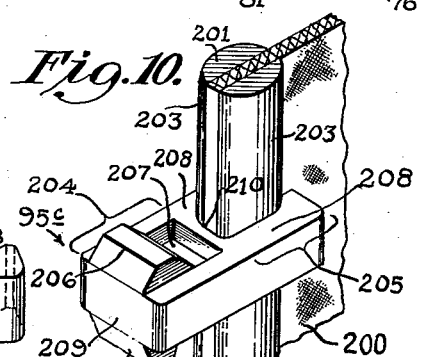
INVENTOR.
Henry A. Simpson
BY
ATTORNEY April 29, 1952 H. A. SIMPSON 2,594,691
MANUFACTURE OF SLIDE FASTENERS
Filed July 1, 1946 8 Sheets-Sheet 6
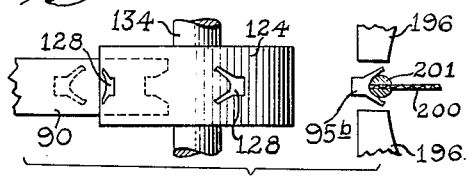
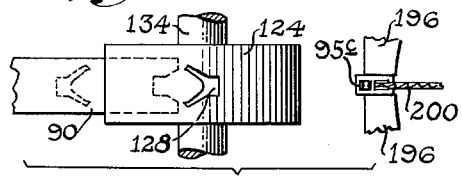
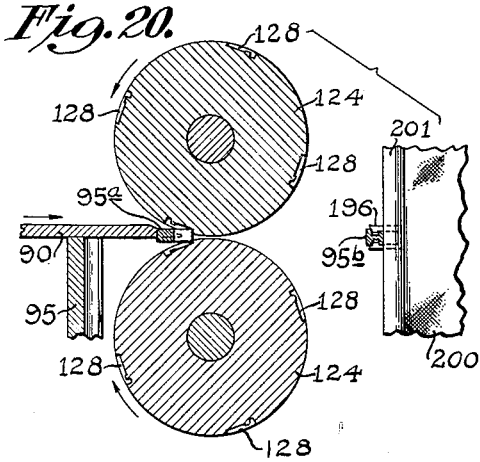
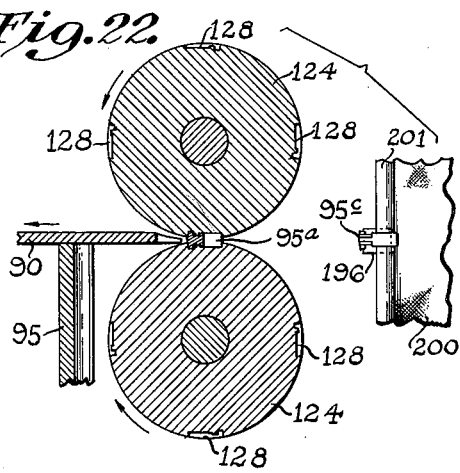
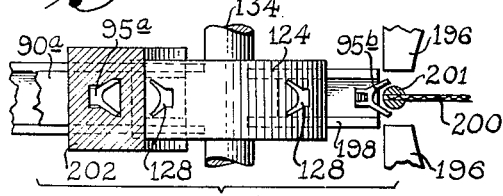
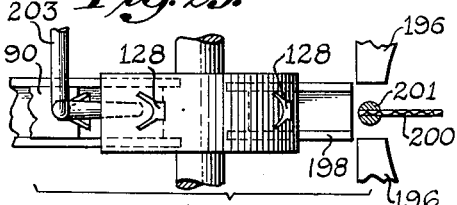
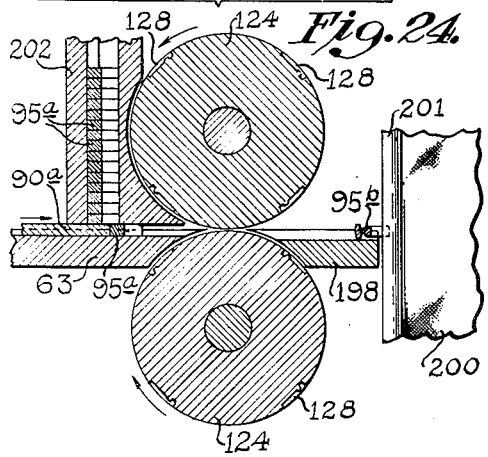
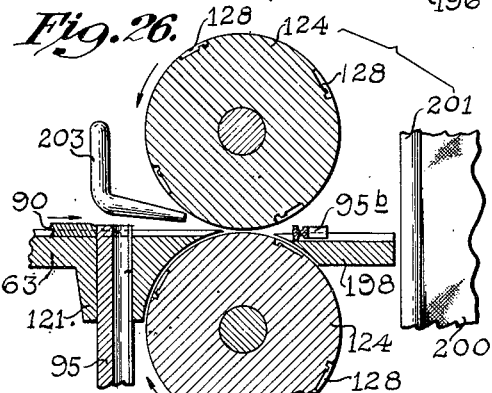
INVENTOR.
Henry A. Simpson
BY
ATTORNEY April 29, 1952     H. A. SIMPSON     2,594,691
MANUFACTURE OF SLIDE FASTENERS
Filed July 1, 1946     8 Sheets-Sheet 7
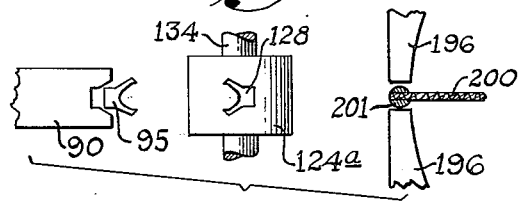
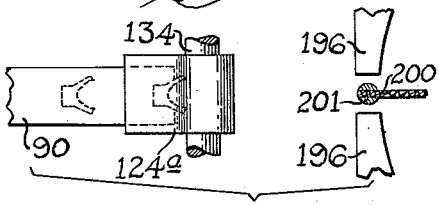
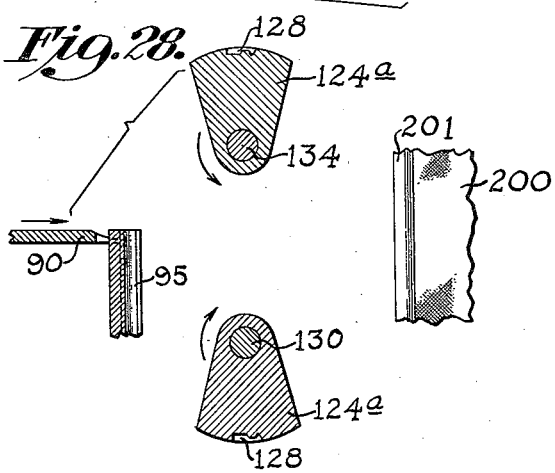
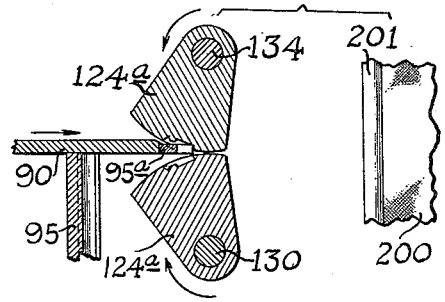
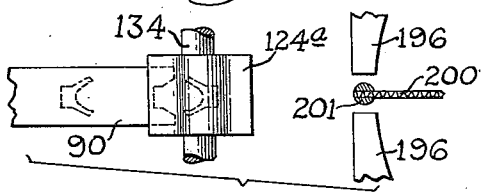
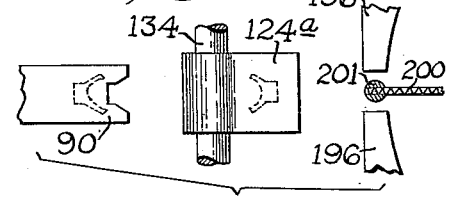
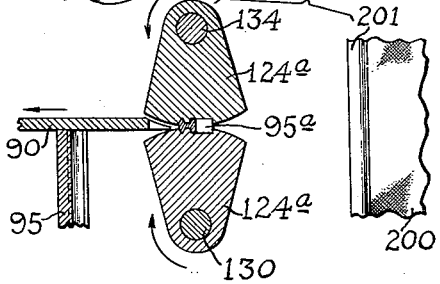
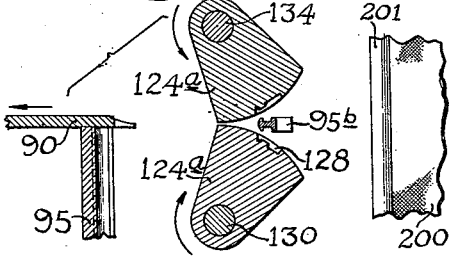
INVENTOR.
Henry A. Simpson
BY
ATTORNEY April 29, 1952  H. A. SIMPSON  2,594,691
MANUFACTURE OF SLIDE FASTENERS
Filed July 1, 1946  8 Sheets-Sheet 8
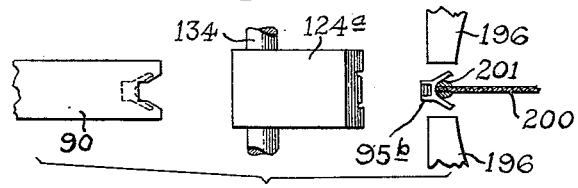
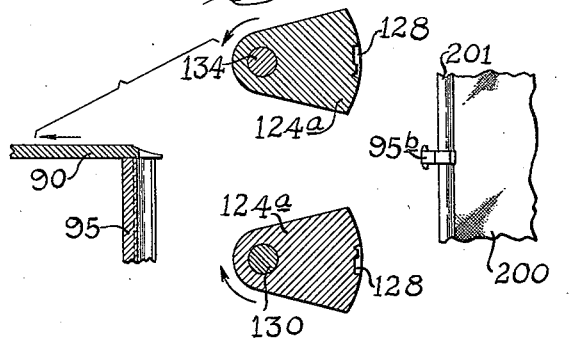
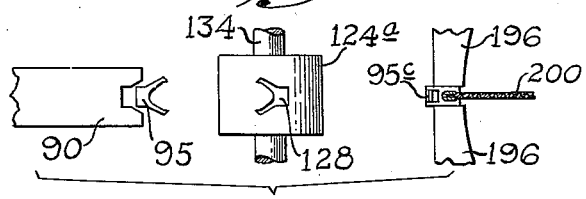
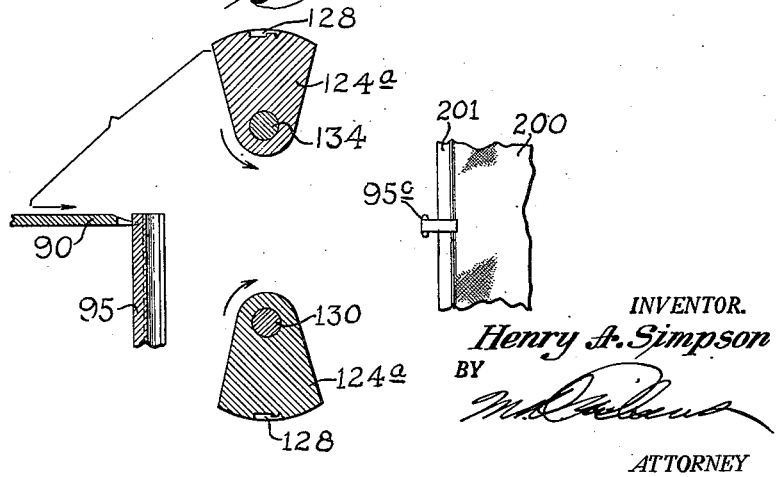
INVENTOR.
Henry A. Simpson
BY
ATTORNEY Patented Apr. 29, 1952

2,594,691

UNITED STATES PATENT OFFICE 2,594,691

MANUFACTURE OF SLIDE FASTENERS

Henry A. Simpson, Philadelphia, Pa., assignor to The North & Judd Manufacturing Company, New Britain, Conn., a corporation of Connecticut Application July 1, 1946, Serial No. 680,684

13 Claims. (Cl. 29—148)

This invention relates to slide fasteners and, in particular, to the provision of new and improved methods and apparatus for the manufacture thereof.

It is an object of this invention to provide a new and improved method of manufacturing slide fastener "chain" or stringer lengths comprising stringer tape lengths having rows of predeterminedly spaced interlocking elements, members, or "scoops" secured thereto.

It is a further object of this invention to provide new and improved apparatus, particularly adapted to carry out the aforementioned method efficiently, rapidly and economically.

It is a further object of this invention to provide such a method wherein the aforesaid scoops are formed independently from individual "slugs" or blanks by the forging or coining action of opposed complementary forming members or dies substantially in intermittent rolling contact whereby, since the coining or forging surfaces travel with the slug or blank, the coining or forging operation is speeded materially, wherein the coined surfaces are smooth and free from burrs and sharp projections and surfaces, and wherein these coined surfaces extend throughout the heads or interlocking portions of the scoops.

It is a further object of this invention to provide such a method, and such apparatus wherein, by reason of the manner in which the forging or coining force is applied in the forming operation, the metal flows toward the head, "nose" or outer end of the scoop whereby any imperfections such as "flash" or "pits" caused by improper filling of the die cavities will occur at the nose or outer end of the scoop or interlocking element where such imperfections do not affect the fastener operation and from whence they may be readily and conveniently removed, or where they may be conveniently treated.

It is a further object of this invention to provide such a method, and such apparatus, wherein the entire exterior, and particularly the head or interlocking surfaces of the scoops, are formed completely by rolling contact with forming die surfaces whereby to obviate sharp or rough surfaces, burrs, and other inaccuracies and to obviate the necessity for tumbling or other surface treatment either before or after attachment of the scoops to the stringer tapes.

It is a further object of this invention, by forming the scoops individually from separate partially preformed slugs or blanks, to maintain close control of metal flow therein and to control the hardness throughout the formed scoops.

It is a further object of this invention to provide such a machine which is of durable and simple construction, substantially fool-proof, and which comprises a plurality of units which are readily accessible and detachably secured to a common frame and driven from a common drive shaft whereby the machine may be quickly and conveniently repaired and serviced when desired, to secure operation with a minimum of "down time."

It is a further object of this invention to provide such a machine wherein the scoop coining or forming dies or die members comprise inserts containing forming or coining cavities which inserts are detachably secured in the die members.

It is a further object of this invention to provide such a machine comprising synchronously driven mechanisms or assemblies for supplying or forming substantially preformed scoop forming slugs or blanks, for supplying the slugs or blanks to complementary forming surfaces, preferably in the form of enveloping coining die cavities, which surfaces or cavities pass through arcuate paths into and out of substantial contact to complete formation of the fastener scoops and to eject or deliver the formed scoops, under their own momentum.

It is a further object of this invention to provide such a machine wherein means is provided for feeding a fastener stringer tape in the path of the formed scoops delivered by the coining die cavities along with means for clamping or clinching the aforesaid formed scoops, in predeterminedly spaced relationship, on the aforesaid stringer tapes.

It is a further object of this invention to provide such a machine wherein all of the aforesaid mechanisms or assemblies are operated in synchronism and through a single power driven main drive shaft.

It is a further object of this invention to provide slide fastener scoops having their exterior surfaces substantially completely formed by rolling contact with enveloping coining die surfaces, and to provide slide fastener stringers embodying such scoops.

These and other objects and advantages of this invention will clearly appear from the following description, taken with the accompanying drawing forming a part thereof, and will be pointed out in the accompanying claims.

In the drawing:

Fig. 1 is a top plan view of an illustrative machine particularly adapted to the accomplishment of my method;

Fig. 2 is a view, in elevation, and partly in section, of the structure shown in Fig. 1;

Fig. 3 is an enlarged longitudinal section, partially broken away and taken substantially on the plane designated by the line 3—3 in Fig. 1, with the frame omitted;

Fig. 4 is an end view, partly in section, of the upper forming die member, the section being taken along the plane indicated by the line 4—4 in Fig. 5;

Fig. 5 is a section taken substantially on the plane indicated by the line 5—5 in Fig. 4;

Fig. 6 is an enlarged top plan view of the cutting knife or the cutting knife and supporting knife slide, as seen in Fig. 1;

Fig. 7 is a section taken substantially on the plane indicated by the line 7—7 in Fig. 6 and illustrating the manner in which the cutting knife may be adjusted;

Fig. 8 is an enlarged isometric view of a fragment of the formed wire from which slugs or blanks are cut by the cutting knife in the embodiment of Figs. 1, 2 and 3;

Fig. 9 is an enlarged isometric view of a slug or blank as severed from the wire or strip of Fig. 8 by the cutting knife, or as formed independently of the machine;

Fig. 10 is an isometric view illustrating the head portion completely die-formed on the blank of Fig. 9, according to this invention, and showing the die-formed scoop or interlocking member clinched to a fastener stringer tape;

Figure 11:
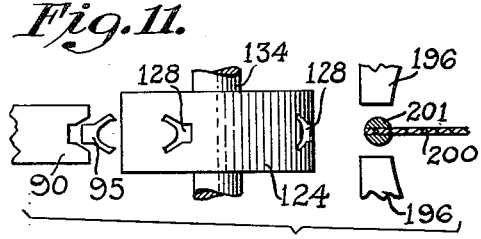
Figure 13:
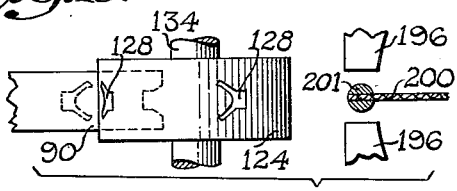
Figure 12:
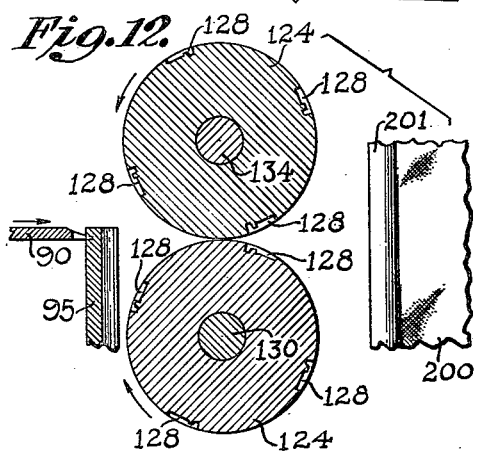
Figure 14:
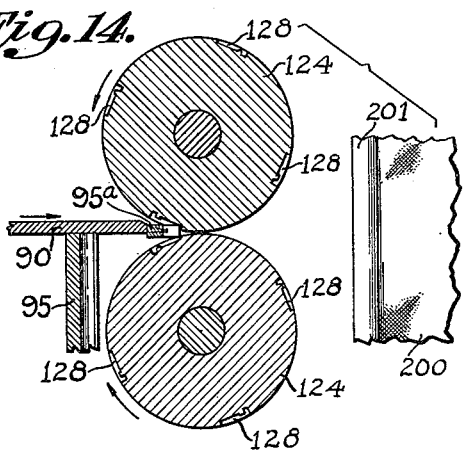
Figure 15:
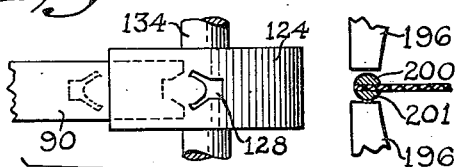
Figure 17:
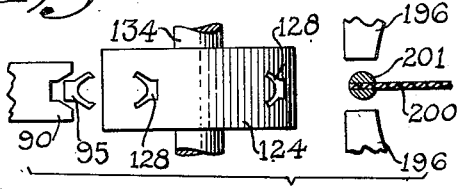
Figure 16:
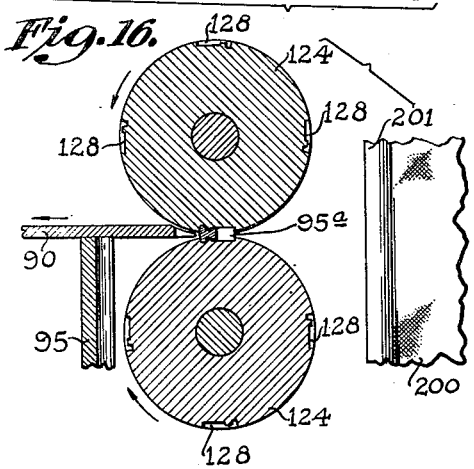
Figure 18:
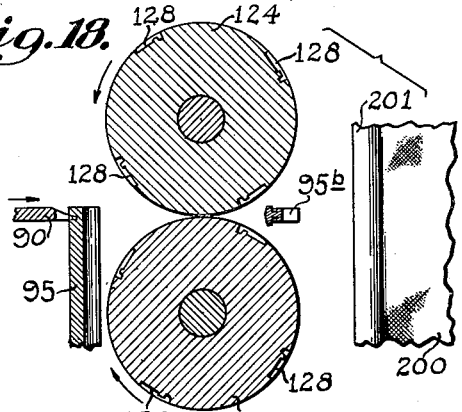

Figs. 11 and 12 are diagrammatic top plan and elevation views, respectively, illustrating the approximate relative positions of the parts of the machine at the beginning of the operative cycle of the machine, when the cutting knife is past the end of its backstroke and moving forward and wherein one pair of complementary die cavities are approaching to receive the slug or blank to be cut from the wire or strip by the cutting knife on its forward stroke;

Figs. 13 and 14 are views similar to Figs. 11 and 12, but showing the cutting knife approaching the end of its forward stroke and placing the cut slug or blank in the closely approaching die cavities;

Figs. 15 and 16 are views similar to Figs. 11 and 12, and Figs. 13 and 14, but showing the cutting knife returning from the end of its forward stroke and the die cavities opposed and engaging the slug or blank, the clearance between the forming dies being exaggerated in Fig. 16 for clearness of disclosure;

Figs. 17 and 18 are similar views but showing the cutting knife past the end of its backstroke and substantially in the position of Figs. 11 and 12 and showing the die formed or coined open jawed, or spread legged, scoop or interlocking member released by the die cavities and travelling jaw first or crotch first toward the stringer tape to which it is to be attached, or clinched;

Figs. 19 and 20 are similar views but showing the cutting knife substantially in the position of Figs. 13 and 14 with the scoop engaged with the stringer tape just prior to operation of the side tools to clinch it thereon;

Figs. 21 and 22 are views similar to Figs. 19 and 20 but showing the operation of the side tools to clinch the scoop to the tape, the knife being substantially in the position of Figs. 15 and 16 with a second slug or scoop blank enclosed by a second pair of complementary die cavities;

Figs. 23 and 24 are diagrammatic top plan and elevation views of a modification of the machine wherein the slugs or scoop blanks are substantially fully preformed to the form illustrated in Fig. 9 independently of the machine and hoppered or fed thereto through a chute or the like;

Figs. 25 and 26 are views similar to Figs. 23 and 24 of another modification wherein ejection of the formed scoops from the die cavities is aided by an air jet;

Figs. 27 and 28 are figures similar to Figs. 11 and 12 but illustrating a modified machine utilizing single cavity forming dies, the cutting knife being shown advancing past the end of its backstroke toward engagement with the scoop forming wire or strip;

Figs. 29 and 30 are views similar to Figs. 27 and 28 but showing the cutting knife approaching the end of its forward stroke and transferring the cut slug to the closing complementary die cavities of the forming dies;

Figs. 31 and 32 are similar views but showing the slug engaged by the die cavities and the knife returning on its backstroke;

Figs. 33 and 34 are similar views showing a subsequent position in the operative cycle wherein the knife is still on its backstroke but the die cavities are opening and ejecting the formed, spread legged, scoop which is travelling, crotch first, toward the stringer tape to which it is to be clinched;

Figs. 35 and 36 are views similar to Figs. 33 and 34 but showing a subsequent position of parts wherein the knife is still on its backstroke or retracting from the forming dies and the scoop has reached the tape just prior to being clinched thereon; and Figs. 37 and 38 illustrate a subsequent position of parts (corresponding substantially with that of Figs. 27 and 28) wherein the scoop has been clinched to the tape and the knife is advancing to cut a subsequent slug or blank from the scoop forming wire or strip.

Heretofore, metallic slide fastener scoops have generally been formed either by casting, which is expensive as well as destructive of textile stringer tapes and limited to the use of relatively soft metals, or by blanking or forging. In the latter methods scoops are sometimes blanked out of metallic strips and progressively formed by separate forging steps or operations; this method is relatively slow and laborious.

In other methods slugs are sliced from preformed strip stock or wire such as that herein illustrated, and designated 95, the slugs being placed in radially spaced cavities in revolving dials in which they are subjected, at various stations, to the action of various reciprocating punches or punch like tools which act in opposition to the die cavities. This method is slow and, since the punches and dies are not symmetrical, the formed scoops are likewise non-symmetrical, some portions thereof being work hardened more than other portions thereof and the exterior surfaces thereof being generally possessed of rough and sharp surfaces and/or burrs, etc.

In still other methods by means either of progressive reciprocating punches or tools, or of opposed rolls with non-symmetrical but joined die cavities and/or punch portions, continuous strips of nested so-called "embryo" scoops are formed in end-to-end relation, these "embryo" scoops being thereafter severed, by reciprocating cutting tools, from the strip approximately concurrently with their attachment to the stringer tapes. These methods or processes may be termed "continuous strip processes".

In such cases, the head or nose surfaces of the attached scoops, having been thus formed by a cutting operation are possessed of sharp surfaces, burrs and other imperfections which are objectionable to the touch of a user and which are obviated according to this invention by die forming these surfaces which are pleasant to the touch, which provide a minimum of interference during engagement and disengagement of the fastener scoops and which are free from burrs or rough sharp surfaces.

By the use of synchronously driven opposed rotary or oscillatory die members with one or more pairs of separate complementary enveloping scoop forming die cavities, and by feeding into these cavities, leg first or crotch first, open legged slugs or blanks, preferably preformed substantially to the general cross sectional form of the formed (though unclinched) scoops, I secure progressive full envelopment of the exterior surfaces of the scoops, during coining, by rolling contact with the enveloping die surfaces. The leg portion of the slug or blank are first engaged, and the metal flow (during coining) is toward the scoop head portion.

If the die cavities are not completely filled by the blank or slug any deficiency (appearing as a concave surface) will occur in the readily accessible nose portion of the scoop. Any flash arising from overfilling of the die cavities will likewise occur at the nose portion of the scoop whence it can be readily and conveniently removed. In either case, the uniformity of work hardening will be substantially uniform throughout the formed scoop and the engaging or interlocking surfaces thereof will be uniform and free from all irregularities.

Since, in my method, the dies engage only one scoop forming slug or blank at a time, the total force applied in forming a scoop is more concentrated than in the aforementioned continuous strip processes. Also, since the operation of the dies is intermittent, momentum is built up in the dies between consecutive scoop forming or coining operations.

The impact provided by the intermittent nature of these operations reduces the power requirements while making possible, and even encouraging, the use of relatively great die radii which obviates many bearing problems existing in continuous strip rolling processes.

Die wear becomes less critical than in such processes because each scoop is formed independently of the others by independent pairs of complementary die surfaces, while in the aforesaid continuous strip rolling processes no complete and discrete coining die cavities are used. In other words, in such strip rolling processes, the forming surfaces comprise joined partial die cavities forming continuous irregular peripheral channels extending about the forming rolls. Completion of the respective cavities to form the scoops completely would destroy continuity of the aforesaid channels and make the production of continuous strip impossible.

In brief, by forming the scoops individually, I am able to use complete coining die cavities which coin those surfaces which are necessarily formed by reciprocatory cutting or clipping operations in continuous strip rolling processes. Significantly, these last mentioned surfaces occur in the interlocking head portions of the scoop, which are of supreme functional importance.

In the following description illustrative means for accomplishing my invention is described in detail.

Referring to the drawing in detail, and with reference particularly to Figs. 1 and 2 of the drawing, it will be seen that the frame of the machine is generally designated 40. This frame 40 is adapted to be firmly secured to any suitable base or support in any suitable manner as, for instance, by bolts 41 (Fig. 1). This frame is shown as an unitary casting or forging adapted to provide rigid support for the sub-frame units and the operative parts of the machine which are detachably secured thereto in assemblies in such manner as to be readily accessible and/or removable, for servicing the machine.

The main shaft, designated 42, extends longitudinally of the frame 40 and is journalled in bearings supported respectively in bearing housings 43, 44 and 45 bolted to frame 40 by bolts 43a, 44a and 45a respectively. At its left end the main or drive shaft 42 is provided with a pulley 46 which is driven at desired speed by a suitable source of power (not shown) with which it may be connected by the belt 47. At its right end the main shaft 42 has secured thereto a handwheel 48 by means of which it may be manually rotated, the handwheel 48 acting also as a flywheel.

The main shaft 42 operates the knife slide assembly by means of the gear 49 secured thereto, the wire or strip feed assembly by means of the cam 50 secured thereto, the scoop-forming die assembly by means of the bevel gear 51 secured thereto, the side-tools or scoop clinching mechanism by means of the gear 52 secured thereto, and the tape feed assembly by means of the cam 53 secured thereto (Fig. 1).

The above described gear 49 at the left end of shaft 42 meshes with gear 54 which is keyed to the knife cam shaft 55, the knife cam 56 being likewise keyed to the cam shaft 55 as shown in Fig. 3, and driven thereby.

The righthand end of the knife cam shaft 55 is supported by a bearing in the bearing housing 55a which housing is secured by bolts 55b to the frame 40 (Figs. 1 and 2).

The lefthand end of the knife cam shaft 55 is supported by a bearing in the bearing housing 55c which is likewise secured to the frame 50 by means of bolts 55d. The bearing housing 55c has a pair of integral laterally spaced upstanding arms 55e extending from the base and bearing supporting portions thereof, these arms 55e each terminating in an apertured ear 55g. The apertures in the ears 55g receive and support a pin 59 which is removable axially therefrom for a purpose which will hereinafter appear.

This pin 59 supports the rear (or lefthand) end of the casting 60 forming the support for the knife operating plunger 61. The forward or righthand end of this casting 60 is secured by a pin 62 (similar to the above described pin 59) to a pair of laterally spaced ears or brackets 63a of a central sub-frame member or casting 63 secured to frame 42 by bolts 63b (Fig. 1). The casting 60 supports opposed pairs of spaced vertical bearing rollers 64 and spaced horizontal bearing rollers 65 adjacent each end between which the plunger 61 is supported for relatively frictionless reciprocation.

The means for reciprocating the plunger 61 comprises a frictionless type cam follower or roller 66 removably secured to the plunger 61 by means of the bolt 67 and nut 68 (Fig. 3). This cam follower or roller 66 rides in the groove or channel 70 of the knife slide cam 56 whereby rotation of the cam 56 is translated into reciprocation of the plunger 61.

At its forward end, the plunger 61 is provided with a slot (Fig. 1) and a crossbore which receives the pin 72 which extends also through a bore or aperture in the rear end of the connector link 73 (Fig. 3). This connector link 73 is provided with a bore at its other (forward) end which receives a pin 74 connecting it with the knife slide 75, the details of which are shown in Figs. 6 and 7.

The knife slide 75 is generally rectangular except for the connector link receiving slot at its rear end through which the pin 74 extends. A pair of gib engaging grooves 76 are provided in the sides of the knife slide 75 (Fig. 7) for engaging a pair of complementary gibs 77 (Fig. 3) provided in the sub-frame member or casting 63 for guiding the knife slide 75. A lubricant recess 78 with cap 79 and transverse branches 80 is provided in the knife slide for lubricating the grooves 76 and gibs 77.

The knife slide 75 is provided with a rectangular recess 81 (Fig. 7) in which the knife retainer block 82 is mounted for longitudinal adjustment, this adjustment being achieved by the vertically adjustable wedge or shoe 83 which is supported adjustably by the shoe retaining and adjusting stud 84 provided with a lock nut 85. Since the forward surface of the shoe 83 is complementary with the inclined rear surface of the retainer block 82, the block 82 may be adjusted longitudinally of the knife slide by adjustment of the wedge or shoe 83 through the stud 84.

In order to lock the knife block firmly to the slide 75 in any desired adjustment, a pair of similar lock screws 86 with lock washers 87 are provided, these lock screws extending through elongated slots 88 (Fig. 1) in the slide 75 and having their lower ends screw-threaded in the knife block 82.

As shown in Figs. 3 and 6, the outer or forward end of the knife block 82 is grooved to receive the knife and/or transfer blade 90 which is secured in position by the retainer screw 89. By the provision of the above described adjustments, the extension of the blade 90 and block 82 beyond the forward end of the slide 75 may be accurately adjusted for cooperation with the forming dies for a purpose which will hereinafter appear.

In order completely to remove and disassemble the plunger 61, knife slide 75 etc., it is merely necessary to remove the pins 59 and 62, and lift the rear end of the casting 60 to release the roller 66 from the cam groove 70 whereupon the slide 75 may be reconditioned or replaced, either in part or entirely, in a matter of a few minutes.

As stated above, the wire stock or strip feed is operated by the main or drive shaft 42 through the cam 50. This wire feed comprises a pair of spaced transverse shafts 91 and 92 (Figs. 2 and 3). As shown in Fig. 3, the shaft 91 has a wire feed roll or roller 93 splined thereon, the periphery of this roller being convex and substantially complementary with the concave or crotch portion of the wire stock or strip 95, the details of which are shown in Fig. 8. A wire feed roll or roller 96 is likewise splined on the shaft 92, this latter roll 96 having a concave periphery substantially complementary with the convex or scoop head forming portion of the wire strip or stock 95.

The shaft 91 is yieldingly urged toward the shaft 92 by means of its support in order that the strip 95 passing between rolls 93 and 96 shall be yieldingly engaged thereby. The support for the shaft 91 comprises a bifurcated bracket or yoke 91a having a bearing pin 91b at its closed end which is slidable in a bore provided in the stationary supporting bracket 91c (Fig. 3). Projecting upwardly from the closed end of the yoke 91a is a stop pin 91d which engages the adjustable stop plate 91f to limit movement of the yoke 91a and approach of the roll 93 toward the roll 96. Adjustable spring means (not shown) is provided for urging the yoke 91a toward the left as seen in Fig. 3.

The shafts 91 and 92 are operatively connected by gear 97 on shaft 91 (Fig. 2) and a similar gear on shaft 92 (not shown) for synchronous rotation in opposite directions to feed the strip or stock 95 upwardly. A brake drum or pulley 98 is secured to the end of the shaft 92 and cooperates with the complementary friction bands 99 (Fig. 2) to prevent overthrow or overrunning of the feed rolls 93 and 96 when a feed impulse is imparted thereto since the brake bands exert a yielding frictional drag upon the shaft 92 (and operatively connected shaft 91) which drag may be adjusted, as desired, by the stud 101 controlling the compression of the spring 100.

The feed rolls 93 and 96 are rotated step-by-step by means of a ratchet wheel 102 fixed to the shaft 92 (Fig. 3), the teeth of this ratchet wheel being engaged by a pawl or tooth 103 on the pawl lever 104. This pawl lever 104 is pivoted at its righthand end (Fig. 3) to the upper end or arm 105 of a double armed bracket or pawl plate which has its other arm 106 extending substantially at a right angle from the arm 105. The bracket or pawl plate 105, 106 is supported for free rocking movement on the shaft 92. A pin 107 on the arm 106 supports the lower end of a tension spring 108 having its upper end supported by a similar pin 109 on the pawl lever 104. Thus, the spring 108 yieldingly urges the tooth or pawl 103 toward engagement with the teeth of the ratchet wheel 102 irrespective of the angular position of the bracket 105, 106.

The bolt 110 provides the pivotal connection between the arm 105 of the bracket 105, 106 and the righthand end of the lever 104 (Fig. 3). As shown in Fig. 1, this bolt 110 also carries the cam follower or roller 111 which engages the groove 112 of the cam 50. Thus, rotation of the cam 50 by shaft 42 causes the bracket 105, 106 to be rocked on the shaft 91, the tooth or pawl 103 riding over the teeth of ratchet wheel 102 on the forward (clockwise Fig. 3) stroke, and engaging a ratchet tooth and advancing the ratchet wheel one step counter-clockwise on the return stroke against the drag of the brake mechanism 98—101 (Fig. 2).

Where continuous chain (with no gap spacing) is manufactured the above described drive of the feed rolls 93, 96 is continuous. However, in order to provide for gap spacing, the drive of the rolls 93, 96 is discontinued at predetermined intervals, depending upon the fastener lengths desired, for predetermined operative periods depending upon the length of the gap spaces desired. The means for thus discontinuing the wire, strip or stock feed comprises a solenoid 114 supported by a bracket 115 which is secured by bolt 116 to the sub-frame 63 (Fig. 1). The armature 117 (Figs. 2 and 3) has a link 118 pivoted to its lower end and the link 118 is provided with an elongated slot 119 at its lower end which receives a pin 120 secured to the outer or free end of the pawl lever 104.

During normal operations of the machine, the solenoid 114 is deenergized and the parts are in the position of Figs. 2 and 3. When, however, a gap space is desired in the fastener strip or chain being manufactured, the solenoid is energized to cause the armature 117 to rise and overbalance the spring 108 whereby the pin 120 on the lever 104 is engaged by the lower end of slot 119 and the lever 104 is raised, against the force of spring 108, to maintain the pawl or tooth 103 out of the path of the teeth of ratchet wheel 102 in spite of the continued rocking of the bracket 105, 106.

When the continuing rocking of the bracket 105, 106 thus effects no movement of the wire or stock feed rolls 93, 96, the wire or stock feed is cut off and the wire strip or stock 95 is not advanced into the path of the reciprocating knife and/or transfer member 90.

The operation of the solenoid 114 may be accomplished manually or automatically by any suitable means wherein the energization and deenergization of the solenoid 114 is electronically controlled.

The wire or strip 95 may be stored in any suitable manner adjacent the feed rolls 93, 96 between which it passes upwardly through the elongated, generally tubular, guide 121 (Fig. 3) which guide is provided at its upper end with an apertured flange 122 through which a screw 123 passes for securing the guide 121 firmly in position.

The reciprocating knife 90 and the step-by-step wire feed, because of the above described operative connections with the shaft 42, are operated in synchronism in such manner that the wire or strip stock 95 is fed a predetermined distance between each forward stroke of the knife 90 whereby a slug or blank of predetermined thickness is sliced off the end of the strip or stock 95 on each forward stroke of the knife 90. This slug or blank is then conveyed by the member 90 to the complementary die cavities of a pair of coining dies as hereinafter described. While these dies may rock or oscillate, in substantial rolling contact, they are herein shown as rotary and each provided with multiple (four, Figs. 1–26) or single (Figs. 27–38) die cavities into, between and through which the scoop blanks or slugs pass to issue as fully formed spread-legged or spread-jawed scoops travelling leg first or jaw forward toward the fastener stringer tape to which they are to be clampingly attached in predeterminedly spaced relationship.

The coining die members (generally designated 124) are superposed as shown in Fig. 3, the upper and lower die members being similar and the details of the upper die member being shown in Figs. 4 and 5.

As shown in Figs. 4 and 5 each die member comprises an elongated hub 124 with an integral gear 125 at one end and radial recesses 126 intermediate its length for receiving die inserts 127 each having a die cavity 128 therein. These inserts are locked in position by lock screws 129 as shown in Fig. 5. The hub 124 of the lower die member is fixed to the shaft 130 which is journalled in the sub-frame member 63 (Fig. 3) and this shaft 130 carries a gear 131 splined thereto and meshing with a gear 132 which is fixedly secured by means of a short shaft 132a to a gear 133 meshing with the gear 51 fixed to the main drive shaft 42 (Figs. 1 and 3).

Thus rotation of the main shaft 42 drives the lower die member 124 through the gear 51, gears 133, 132, gear 131 and shaft 130 to which this die member 124 is non-rotatably secured. Since the integral gear 125 of the lower die member 124 is in mesh with the integral gear 125 of the upper die member 124, rotation of the lower die member 124 in clockwise direction causes synchronous rotation of the upper die member 124 in counter-clockwise direction in such manner that pairs of the die cavities 128 substantially engage seriatim.

While the lower die member 124 is fixed to the shaft 130, the upper die member 124 is supported for free rotation by the shaft 134, a pair of similar annular bearing bushings 135 with flanges 136 being interposed between the shaft 134 and the internal bore of the die member 124 (Fig. 5). These bushings 135 are also provided with lubricant retaining grooves or channels which receive lubricant from the branches 134b of the central lubricant chamber 134a of the shaft 134 and control its distribution. Lubricant is supplied to the central lubricant chamber 134a through the lubricant pressure fitting 138 screw-threaded in the open end of the chamber 134a as shown in Fig. 5.

The shaft 134 is supported in a yoke 140 having spaced arms provided with bores 141 receiving and supporting the ends of the shaft 134 which are secured therein by means of retaining screws or studs 142. The yoke 140 is provided at its upper end with a channel or groove 143 receiving a wedge 144 having its upper surface engaging the cap plate 145. This cap plate is supported at each end by an upright extension 63c of the sub-frame unit 63 to which the cap plate 145 is secured by screws 146 (Fig. 3).

An aperture 147 is provided in one extension 63a to receive the wedge adjusting screw 148 which engages a screw-threaded recess 149 in the wedge whereby the wedge 144 may be moved crosswise, or right or left as seen in Fig. 5, to adjust the upper die member 124 toward or away from the lower die member 124. In order fixedly to secure the yoke 140 in adjusted position, four retaining studs 150 extend through the cap plate and screw-threadedly engage the yoke 140 as shown in Figs. 4 and 5.

The knife and/or transfer member 90 is reciprocated on its advance or forward stroke at such varying speed (controlled by the shape of the groove or channel 70 in the cam 56) that the maximum speed thereof is reached substantially at the instant of its contact with the strip or wire 95, i. e. between the position of Figs. 11 and 12 and the position of Figs. 13 and 14. Its forward linear speed then decreases until it closely approaches and substantially equals the linear peripheral speed of the dies 124 at the instant of release, adjacent and just past the position of Figs. 13 and 14 whereupon its direction is changed and it is withdrawn from the scoop 95a which has been transferred to the cavities 128 (Figs. 15 and 16).

While the length of stroke of the knife and/or transfer member 90 is fixed by the shape or contour of the groove or channel 70 in the cam 56 (which cam may be readily detached and replaced by another with groove 70 of different shape or contour), the extension of the block 82 and member 90 beyond the knife slide 75 may be adjusted, as described above, to control the position of the member 90 with respect to the die members 124 (or 124a) at the end of its forward stroke, to define the point of release whereat the scoop blank or slug 95a is transferred to the die cavities 128.

While any known form of stringer tape supporting and feeding means may be used in the machine to accomplish the method of this invention, one suitable form of such tape supporting and feeding means is shown in Figs. 1 and 2. This means provides step-by-step tape feed (although continuous tape feed might, as well, be used) and includes a pair of uprights 151 and 152 detachably secured to frame 40 and projecting from the frame 40 upwardly beyond the sub-frame member 63, with a shaft 153 journalled for free rotation therein and extending from the righthand end of the machine to the uprights 151 and 152 and therebetween.

Fixed to the shaft 153 between the uprights 151 and 152 are a gear 154, an adjacent suitably clothed tape feed roll 155 with a tape bead or cord guide groove or channel 156, and an interior toothed ratchet wheel 157. The ratchet wheel 157 is driven by a pawl mechanism (not shown) operated by means including the pawl lever, link or pitman 158 (Fig. 1), functionally similar to the above described pawl lever 104 which, in turn, is driven or oscillated by the above-mentioned cam 53 on the shaft 42. The ratchet wheel 157 is thus driven step-by-step, clockwise as seen from the right in Figs. 1 and 2.

Overrunning or overthrow of the shaft 153 is prevented by a brake mechanism similar to the above described brake mechanism 98—101 and comprising brake drum 159 secured to the shaft 153 adjacent the handwheel 160 at the end thereof, and a pair of cooperating friction bands 161, 161 similar to the above described bands 99. The drag of the bands 161, 161 upon the drum 159 is adjustably controlled by the stud 162 and spring 163. The friction bands 161 are supported by the stud 164 which is secured to the shaft supporting bracket 165 which bracket is bolted to the frame 40 by means of bolts 166 as shown in Figs. 1 and 2 and in the upper end of which bracket the shaft 153 is journalled as shown in Fig. 2.

By means of handwheel 160, the tape feed mechanism may be operated manually independently of rotation of shaft 42, for loading the machine with stringer tape, for splicing stringer tape, etc.

At their upper ends, the uprights 151 and 152 support a shaft or pin 167 upon which is journalled one end of an idler roll carrier frame 168 having the suitably clothed friction or idler roll 169 supported for free rotation adjacent the other or outer end thereof. This idler roll 169 has a gear 170 integral therewith and adapted to mesh with the above described gear 154. The outer end of the carrier frame 168 is yieldingly drawn downwardly, to accomplish this yielding meshing of gears 154 and 170 by means of the pin 171 secured to the carrier frame 168 and to the pin 172 secured to the upright member 152 having the tension spring 173 secured therebetween. An upright handle 174 is secured to the inner or pivotal end of the carrier frame 168 and provides means for manually swinging the roll 169 upwardly away from the roll 155, 156 while bringing the gear 170 out of mesh with the gear 154.

Cooperating with the above described feed roll structure is the tape guide and tension mechanism comprising a stationary guide block 175 of proper shape or contour to closely engage one side of the fastener stringer tape and a cooperating, substantially complementary friction block 176 supported by an adjustably supported plunger 177 and yieldingly urged downwardly by the compression spring 178.

The stringer tape upon which the scoops are to be attached passes into the machine between the guide block 175 and friction block 176 thence upwardly between the side-tools or through the clinching mechanism, as hereinafter described, and over the tape feed roll 155, 156 and thence under the feed tension roll 169.

Disposed below this tension roll 169 in its operative position is a trough or guide 179 which conveys the stringer tape (and scoops attached by the side-tools or clinching mechanism) to a suitable collection station, basket or container. An L-shaped guide plate or bracket 180 is provided for guiding the tape in its upward travel, adjacent the side-tools or clinching mechanism.

As stated above, the shaft 42 operates the side-tools or scoop clinching mechanism by means of the gear 52. As shown in Figs. 1 and 2, this gear 52 meshes with a gear 181 secured to a shaft 182 having a gear 183 secured to its other end. The shaft 182 is journalled in a support or bracket 184 bolted to the floor of the frame 40 as shown in Fig. 1.

The gear 183 meshes with a gear 185 secured to the lower end of the vertical side-tool cam shaft 186 which has the side-tool cam 187 secured to the upper end thereof. Thus, the cam 187 is driven from the main or drive shaft 42 through gear 52, gear 181, shaft 182, gears 183, 185, and shaft 186 at predetermined speed and in synchronism with the scoop forming wire or stock feed, the cutting knife mechanism, the coining dies and the tape feed.

The shaft 186 is journalled in the bearing bracket 188 secured by bolts 189 to the base 40 as shown in Fig. 2. The cam 187 on shaft 186 is provided with a groove 190 engaged by the cam follower or roller 191. The roller 191 is rotatably supported upon the lower end of the pin 192. The pin 192 extends through the block 193 which block is reciprocated thereby in the way or guide provided in the stationary plate 194 as shown in Figs. 1 and 2.

Pivotally connected at one end to this pin 192 are a pair of similar links 195 each having its other end pivotally connected with one end of a side-tool 196. The other end of each side-tool 196 is pivotally supported by a stationary pin or stud 197 fixed to the plate 194. The ends of the side-tools 196 adjacent the studs 197 have flat, scoop-engaging surfaces thereon which swing toward one another about the axes of pins 197 to clinch the scoop therebetween upon the stringer tape disposed therebetween upon each reciprocation of the block 193 leftward as shown diagrammatically in Figs. 1 and 2 (compare, also Figs. 19 and 21).

As shown in Fig. 3, a guide way 198 of suitable cross-sectional contour is provided between the coining die members 124 and the clinching mechanism or side-tools 196 for guiding the die formed scoops in their travel, under their own momentum, to the position in which they are clinched on the stringer tape by the side-tools 196.

In the embodiment of the machine illustrated in Figs. 1–22, the cutting knife which severs the scoop blanks or slugs from the wire stock, strip or wire is designated 90. Because of its shape, which is substantially complementary with the exterior head and leg surfaces of the blank, it serves also as transfer means or transport means for transferring or transporting the severed slug or blank into the coining die cavities.

In Figs. 11–22 inclusive, the dies are designated 124 and the die cavities are designated 128. The strip, wire or stock is designated 95 while the severed slugs or blanks are designated 95a; the die formed or coined but unattached scoops are designated 95b while the attached or clinched scoops are designated 95c. The stringer tape is designated 200, and the reinforced scoop supporting edge thereof is designated 201. The sidetools are designated 196.

In the embodiment of Figs. 23 and 24, a transfer member or transport member 90a is substituted for the cutting knife 90, the sharp cutting edge being omitted from the member 98a, since it performs no cutting function.

The slugs or scoop forming blanks 95a are performed and supplied by chute 202 to the transfer member or transport member 90a in the embodiment of Figs. 23 and 24, the method being otherwise simliar to that of Figs. 11-22 and the structure of the machine being similar to that illustrated in Figs. 1-7 save for omission of the cutting edge from the transfer member or transport member 90, and substitution of a preformed blank or slug supplying hopper or chute such as 202 for the wire, strip or scoop stock feed mechanism in the relation illustrated in Figs. 23 and 24.

While the formed scoops 95b may be conveyed by their momentum from the forming dies 124 to the stringer tape 200, as shown in Figs. 11-24, their transfer from the forming station to the clinching station may be aided by other means. For instance, I may use positive mechanical means or an air jet provided by an air pressure conduit such as that designated 203 in Figs. 25 and 26 leading from a suitable source of air pressure (not shown) and discharging between the die members 124 in the direction of the stringer tape.

While the die members 124 of Figs. 1 to 5, and 11 to 26 inclusive, are shown as annular and containing four sets of complementary coining die cavities 128, they may comprise single cavity die members 124a, or die members having any desired number of scoop coining die cavities 128, the only necessary variation in the mechanism of Figs. 1 to 3 inclusive, being in the gear ratio between the shaft 42 and the shaft 130.

Figs. 27 to 38 inclusive, illustrate the operative cycle wherein single cavity die members 124a are so substituted, and it will be noted that in such case the shaft 130 and the dies 124a are driven four times as fast, with relation to the speed of the other operative assemblies, as where four cavity die members 124 are used.

It is, of course, to be understood that I contemplate the practice of my invention wherein the scoop attaching mechanism is separate from and independent of the scoop forming mechanism, or where the formed scoops 95b delivered by the complementary die members 124 or (124a) are collected and thereafter fed to any suitable scoop hoppering and/or attaching means.

The details of the scoop forming stock, wire or strip 95 are shown diagrammatically and isometrically in Fig. 8, the details of the scoop forming slugs or blanks 95a are shown in Fig. 9 in the same manner, while a similar showing of one illustrative form of double-acting or symmetrical scoop 95c clinched to a stringer portion, is made in Fig. 10.

The illustrative stringer tape 200, 201 of Fig. 10 comprises a flat flexible tape portion 200 having secured to opposite sides of one edge cords 203 by stitching (not shown) which cords 203 form the edge reinforcement 201 described above.

The scoop 95c (Fig. 10) considered lengthwise, comprises a head portion or interlocking portion 204 and a leg portion or jaw portion 205 which may also be termed the tape engaging or clamping portion.

The head or interlocking portion of the illustrated scoop comprises similar aligned, or superposed, upwardly and downwardly projecting crowns or projections 206, each with a complementary pocket or recess 207 disposed adjacent and inwardly thereof. The outer end of the head or interlocking portion of the scoop may be termed the nose thereof and is designated 209. The nose surface may be considered an inactive surface of the head or interlocking portion of the scoop since it is not engaged by surfaces of adjacent scoops in a fastener when it is opened and/or closed; thus the smoothness thereof is desirable as affecting only the visual and tactile properties of the scoop.

The leg portion or jaw portion 205 of the scoop comprises a pair of similar, spaced, oppositely disposed legs or jaws 208 separated by a crotch or crotch portion 210 which engages the edge reinforcement 201 of the stringer tape. The respective portions of the slug or blank 95a (Fig. 9) forming these surfaces and portions after diecoining or die forming, according to this invention, are appropriately designated in Fig. 9.

As will be readily understood from the above description, especially when taken with the diagrammatic showings of Figs. 11-35 inclusive, it is preferable, and advantageous, that the scoop blanks or slugs 95a be fed leg first or jaw forward to the die cavities 128 and that the die cavities 128 be appropriately disposed with respect to the direction of travel to receive and form the scoop-forming blanks and to eject the formed, spread legged scoops leg first or crotch forward.

When the slugs or blanks and the die cavities are so disposed the cavities or die surfaces, in closing upon or engaging the slug or blank, first engage the area of least resistance since the area of the leg end portions is materially less than that of the head portion. In addition the momentum stored up in the die since occurrence of the preceding scoop coining operation insures substantial impact upon the engagement of the cavities with the leg portions resulting in a quick roll coining operation wherein metal flow from leg end to head end is so controlled, at relatively high die speeds, as to secure completion of the coining operation, i. e., closing of the scoop head forming die portions or surfaces, before the occurrence of flash.

Furthermore, where the die speed is insufficient thus to prevent flash, such flash will occur at the scoop nose surface whence it may readily and conveniently be removed.

As will also be readily understood, the exterior scoop surfaces, including the engaging interlocking surfaces, are formed by rolling contact of the die surfaces therewith. Naturally such rolling contact forms surfaces of superior smoothness, unobtainable in blanked, cut or clipped surfaces or in surfaces formed by reciprocating forming dies or tools.

By utilizing slugs preformed to the same general cross-sectional shape as the formed scoop, substantial work and metal movement in the coining operation is obviated and this is particularly noticeable where the scoops are of the spread legged type since the main duty in forming the strip or stock 95 is expended in forming the crotch forming portion thereof. By forming this strip or wire 95 independently of the machine, by rolling for instance, the dies are relieved of a substantial amount of heavy strains and work, thus enabling me to maintain the weight and dimensions of the dies and other accurate parts at a minimum commensurate with good engineering practice, for high speed and efficient operation.

While I have illustrated one form of double-acting or symmetrical scoop formed according to my invention, it is, of course, to be understood that it is applicable to the production of various other types including conventional non-symmetrical single acting scoops, such adaptations and variations being readily achieved by appropriate variation in the forming die surfaces.

From the above description, it will clearly appear that I have provided a new and improved method of manufacturing slide fastener stringers and scoops therefor in which method scoops of superior quality are completely die formed in a single stage or step, and that I have provided new and improved apparatus particularly adapted for accomplishing the aforesaid method.

It is, of course, to be understood that the above description is merely illustrative and in nowise limiting and that I desire to comprehend within my invention such modifications as are included within the scope of the following claims.

Having thus fully described my invention, what I claim as new and desire to secure by Letters Patent is:

1. In a method of forming slide fastener scoops from individual blanks of plan cross-sectional shape approximating that of said scoops, separately enveloping and rolling said blanks progressively from end to end for completely coining their outer surfaces.

2. In a method of forming slide fastener scoops with interlocking head portions at one end and spread leg portions separated by a crotch portion at the other end from partially preformed individual blanks of exterior cross-sectional shape approximating that of said scoops and of substantially equal volume, separately enveloping and roll firming said blanks progressively from leg-end to head-end for substantially completely roll coining their outer surfaces.

3. In a method of forming slide fastener scoops with interlocking head portions at one end and spread leg portions separated by a crotch portion at the other end from preformed slugs of cross-sectional shape approximating that of said scoops and of substantially equal volume, separately enveloping and die-rolling said slugs progressively from leg-end to head-end for substantially completely coining their outer surfaces and fully developing their head portions.

4. In a method of making a slide fastener scoop of the class described, the step of roll coining an individual scoop forming blank completely from end to end.

5. In a method of forming slide fastener scoops, the step of completely roll forming an individual blank to final shape in a single rolling pass.

6. In a method of forming slide fastener scoops each with a head portion and a leg portion, said head portion having aligned male members extending beyond the upper and lower sides thereof, progressively roll coining separate scoop-forming blanks of substantially uniform thickness progressively from the leg end to the head end to raise the male members of the head portion beyond the top and bottom sides of said blanks.

7. In a method of forming double acting slide fastener scoops each with a head portion and a leg portion, said head portion having aligned male interlocking members extending beyond the upper and lower sides thereof, progressively roll coining separate scoop-forming blanks of substantially uniform thickness progressively from the leg end to the head end while raising the male interlocking members of the head portion beyond the top and bottom sides of said blanks.

8. In slide fastener scoop forming means, a pair of synchronously driven rotary die members rotating in similar paths about spaced parallel axes and having complementary scoop forming coining die cavities moving into and out of substantial contact, and means for supplying individual scoop-forming blanks to said complementary scoop-forming die cavities for roll coining thereby to form said scoops.

9. In apparatus for forming slide fastener scoops, in combination, a pair of synchronously driven die members rotatable about spaced axes and including a pair of complementary independent scoop forming coining die cavities adapted for successive substantial engagement, and means for supplying individual scoop-forming slugs to said complementary die cavities before each of successive engagements, said means comprising a blade member reciprocating toward and from the zone of engagement of said complementary die cavities in synchronism with said die members and adapted to carry a slug on each of successive forward strokes toward said zone of engagement, means to reciprocate said blade member toward and from said zone in strokes of fixed amplitude and means for adjusting the postiion of said blade member with respect to said zone of engagement of said die cavities.

10. In apparatus for forming slide fastener scoops, in combination, a pair of synchronously driven die members rotatable about spaced axes and including a plurality of pairs of complementary independent scoop-forming coining die cavities adapted for repeated substantial engagement, and means for supplying individual scoop-forming slugs to said complementary die cavities before each of successive engagements comprising a blade member reciprocating toward and from the zone of engagement of said complementary die cavities and adapted to carry a slug on each of successive forward strokes toward said zone of engagement, and means to reciprocate said blade member toward and from said zone at varying speeds approaching the speed of said die cavities at one point for transferring a slug to a pair of said die cavities thereat.

11. In apparatus for forming slide fastener scoops, in combination, a pair of synchronously driven die members rotatable about spaced axes and including a plurality of pairs of complementary scoop-coining female surfaces adapted for repeated substantial engagement, and means for supplying individual scoop-forming slugs to the pairs of said complementary surfaces before each of successive engagements, comprising a blade member reciprocating toward and from the zone of engagement of said complementary surfaces and adapted to carry a slug on each of successive forward strokes toward said zone of engagement, means to reciprocate said blade member toward and from said zone in strokes of fixed amplitude, and means for adjusting the position of said blade member with respect to said zone of engagement.

12. A method of making a slide fastener stringer comprising a flexible tape with a row of scoops clamped thereon, each of said scoops having a jaw portion at one end and an interlocking head portion at the other end, said method comprising subjecting to rolling contact with complementary die-forming surfaces travelling synchronously in opposite directions in substantially engaging arcuate paths, a preformed blank of substantially Y-shaped section and of volume approximating that of a spread-jawed scoop to form said scoop while concurrently imparting thereto sufficient momentum for moving said formed scoop toward and into engagement with a tape, clinching the jaw portion of the formed scoop against said tape to attach said scoop to said tape, and moving said tape a desired distance after attachment of each scoop thereto.

13. The structure defined in claim 9, said means for supplying individual scoop-forming slugs to said die cavities comprising a hopper disposed above a part of the path of said blade member.

HENRY A. SIMPSON.

REFERENCES CITED

The following references are of record in the file of this patent:

UNITED STATES PATENTS

| Number | Name | Date |
| --- | --- | --- |
| 1,467,015 | Sundback | Sept. 4, 1923 |
| 1,903,659 | Smith | Apr. 11, 1933 |
| 2,201,068 | Wintritz | May 14, 1940 |
| 2,221,740 | Ulrich | Nov. 12, 1940 |
| 2,310,660 | Ulrich | Feb. 9, 1943 |
| 2,320,651 | Poux | June 1, 1943 |
| 2,330,936 | Ulrich | Oct. 5, 1943 |
| 2,335,034 | Winterhalter | Nov. 23, 1943 |
| 2,378,719 | Morin | June 19, 1945 |
| 2,440,007 | Frank | Apr. 20, 1948 |
| 2,486,941 | Graf | Nov. 1, 1949 |

FOREIGN PATENTS

| Number | Country | Date |
| --- | --- | --- |
| 616,421 | Germany | Mar. 8, 1933 |